Patented Sept. 4, 1951

2,566,516

UNITED STATES PATENT OFFICE 2,566,516

PLASTIC MARKING COMPOSITION

Elmer R. Derby, Leominster, Mass., assignor, by mesne assignments, to Foster Grant Co., Inc., Leominster, Mass., a corporation of Massachusetts No Drawing. Application November 16, 1948, Serial No. 60,390

2 Claims. (Cl. 260—23)

This invention relates to a plastic marking composition, and more particularly to a moldable composition suitable for the manufacture of a plastic crayon, pencil, and the like.

One of the objects of the invention is to provide a composition that can be readily molded to form a writing or drawing instrument, which instrument is non-smudging, unaffected by water, and of high strength.

Another object of the invention is to provide a composition of the character described that is more resistant to heat than wax crayons.

A further object of the invention is to provide a composition that is moldable on standard molding machines or devices.

A still further object of the invention is to provide a composition that will produce a crayon which can be sharpened to a fine point like a pencil, and that will hold its point.

Other objects and advantages of the invention will appear from the following description thereof.

According to the present invention I form a composition composed of a resin, preferably a synthetic resin; a synthetic wax or waxlike organic substance; and coloring matter such as a suitable pigment, lake, or the like; to which ingredients a filler and/or a lubricant may be added.

The ingredients may be used in varying proportions substantially within the following ranges by weight:

| | Per cent |
|---|---|
| Resin | 5 to 40 |
| Waxes | 10 to 60 |
| Coloring matter | 1 to 70 |
| Filler | 0 to 70 |
| Lubricant | 0 to 20 |

Representative examples of the composition are:

| | No. 1 | No. 2 | No. 3 | No. 4 | No. 5 |
|---|---|---|---|---|---|
| | Per cent | Per cent | Per cent | Per cent | Per cent |
| Polyvinyl butyral | 15 | 10 | 15 | 17 | 17 |
| N-cetyl acetamide | 23 | 35 | 30 | 23 | 23 |
| Coloring matter | 15 | 15 | 15 | 15 | 20 |
| Clay | 45 | 38 | 38 | 43 | 38 |
| Stearic acid | 2 | 2 | 2 | 2 | 2 |

The polyvinyl butyral serves as a bonding, hardening, and toughening agent. This resin may be replaced by any of the synthetic resins of the following group: polyvinyl formal, polyvinyl acetal; or polyvinyl acetate. Increasing the proportion of the resin used results in a composition that will produce a harder, tougher, and stronger finished product.

The waxes or waxlike organic substances are employed as bonding agents in conjunction with the resin. Any of the following waxes or waxlike organic substances may be used: n-cetyl acetamide, chlorinated naphthalene, or octadecenamide. Some of these substances, as for example n-cetyl acetamide, have lubricating properties and may serve additionally as a lubricating agent. Stearic acid, which is usually classified as an acid, has many waxlike physical properties and may be used to replace in part some of the other waxes or waxlike substances. For instance, stearic acid may replace some of the n-cetyl acetamide, but I have found that excessive exudation occurs when the proportions of these two substances are nearly equal. The lower the proportion of the wax or waxlike substance used in the composition, the harder and tougher will be the resultant product and, conversely, the higher the proportion of that substance used in the mixture, the softer and more ductile or pliable will be the finished product. I have found that a compound containing about 18% n-cetyl acetamide, about 2% stearic acid, and about 5% metaterphenyl by weight, will result in a molded crayon that is soft, non-brittle, and that can be bent through an angle of 90° without breaking.

The coloring matter will, of course, be selected according to the desired color of the product. Among the coloring ingredients suitable are: bone black; "C. A. #3" black; titanium dioxide; ramapo blue; helio fast yellow; cadmium red; and toluidine toner. These substances may be used alone, or mixed in various proportions, to produce the desired colors. By way of example, a mixture containing 15% by weight of "C. A. #3" will produce a satisfactory black crayon; one containing about 13% titanium dioxide, 0.1% helio fast yellow, and 2.4% ramapo blue, will result in a blue crayon; a mixture of about 16% cadmium red and 4% toluidine toner, give the product a red color; and about 8% titanium dioxide, 8% helio fast yellow and 1% ramapo blue will produce a green crayon.

The filter gives added body to the composition and assists in preventing the composition from sticking in the mold. The fillers preferably used are, clay especially a soft domestic clay, or wood flour. The filler is to a considerable extent interchangeable with the coloring matter without effecting any marked change in the properties of the finished product. Reducing the amount of filler used results in a more ductile but slightly weaker product and a harder writing lead. As hereinbefore noted, the filler may, in some instances, be wholly dispensed with.

The lubricant may be optionally used to make the compound stronger and tougher and to prevent it from sticking in the mold. The preferred lubricant used is stearic acid, and generally used in an amount of about 2% by weight.

The several ingredients are mixed dry and in any order. The mixture is then fed to a heated roll mill, or the like, and worked until a coherent homogeneous mass is obtained. The coloring matter may be added either in the dry mix before working or after all of the other ingredients have been mixed. The composition may be molded in the shape of the desired finished product in any conventional molding machine or device, and according to the well-known technique employed in the wax crayon art.

I am well aware of the fact that n-cetyl acetamide has been used in small proportions as a tack reducing ingredient for plasticized polyvinyl butyral compound. Its compatability is very low and the amount of wax used varied from ¼ to 3 parts per 100 parts by weight of the polyvinyl butyral compound. It was, therefore, an unexpected and surprising result when I found that the polyvinyl resin would tolerate and hold in tight union, without wax exudation, proportions as high as are stated above in the given percent ranges for the ingredients of the composition.

While I have described a preferred embodiment of the invention, with modifications thereof, it is to be understood that these are given by way of example only and not in a limiting sense, and that the scope of the invention is to be determined by the objects and the claims.

I claim:

1. A plastic marking composition consisting substantially of about 10%–17% by weight polyvinyl butyral, about 23%–35% by weight n-cetyl acetamide, about 2% by weight stearic acid, about 38%–45% by weight clay, and about 15%–20% by weight coloring matter.

2. A plastic marking composition consisting substantially of about 15% by weight polyvinyl butyral, about 23% by weight n-cetyl acetamide, about 2% by weight stearic acid, about 45% by weight clay, and about 15% by weight coloring matter.

ELMER R. DERBY.

REFERENCES CITED

The following references are of record in the file of this patent:

Page 219, The Rubber Age and Synthetics, vol. 28, Sept. 1947.